US008923993B2

(12) United States Patent
Kulathu et al.

(10) Patent No.: US 8,923,993 B2
(45) Date of Patent: Dec. 30, 2014

(54) METHOD AND SYSTEM FOR ENGINEERING A SUBSTATION AUTOMATION SYSTEM

(75) Inventors: Ganesh Kulathu, Bangalore (IN); Wolfgang Wimmer, Rietheim (CH)

(73) Assignee: ABB Technology Ltd., Zürich (CH)

( * ) Notice: Subject to any disclaimer, the term of this patent is extended or adjusted under 35 U.S.C. 154(b) by 0 days.

(21) Appl. No.: 13/396,018

(22) Filed: Feb. 14, 2012

(65) Prior Publication Data

US 2012/0239170 A1 Sep. 20, 2012

Related U.S. Application Data

(63) Continuation of application No. PCT/IB2010/000569, filed on Mar. 18, 2010.

(30) Foreign Application Priority Data

Aug. 14, 2009 (IN) .......................... 1935/CHE/2009

(51) Int. Cl.
- *G05B 19/42* (2006.01)
- *G05D 3/12* (2006.01)
- *G05B 19/042* (2006.01)

(52) U.S. Cl.
CPC ......... *G05B 19/0426* (2013.01); *Y02B 70/3241* (2013.01); *Y04S 20/227* (2013.01)
USPC ................................ 700/87; 700/83; 700/286

(58) Field of Classification Search
None
See application file for complete search history.

(56) References Cited

U.S. PATENT DOCUMENTS

| 7,096,165 | B2 * | 8/2006 | Pantenburg et al. | 703/1 |
| 2005/0215107 | A1 | 9/2005 | O'Donnell et al. | |
| 2006/0116794 | A1 * | 6/2006 | Stoupis et al. | 700/286 |
| 2008/0127210 | A1 * | 5/2008 | Bosold et al. | 719/313 |
| 2009/0254655 | A1 * | 10/2009 | Kidwell et al. | 709/224 |

OTHER PUBLICATIONS

International Search Report (PCT/ISA/210) issued on Jul. 20, 2010, by European Patent Office as the International Searching Authority for International Application No. PCT/IB2010/000569.
Written Opinion (PCT/ISA/237) issued on Jul. 20, 2010, by Japanese Patent Office as the International Searching Authority for International Application No. PCT/IB2010/000569.
Apostolov, Alexander, "Load-Shedding in Distribution Systems During Wide Area Disturbances", 18th International Conference on Electricity Distribution, XP-002639780, Jun. 6-9, 2005, 4 pps.
Kostic et al, "Understanding and using the IEC 61850: a case for meta-modelling", Computer Standards and Interfaces, Oct. 18, 2004, pp. 679-695.
Office Action issued on Sep. 17, 2013, in corresponding U.S. Appl. No. 13/372,990, 17 pps.

\* cited by examiner

*Primary Examiner* — Sean Shechtman
(74) *Attorney, Agent, or Firm* — Buchanan Ingersoll & Rooney PC

(57) ABSTRACT

A method for engineering and configuration of one or more IEDs for a function in a substation automation system is disclosed. Also disclosed is a configuration wizard for implementing the method. The method includes creating pre-defined type definitions for an application function, providing a selectable menu for selection of appropriate parameters with respect to the application. Using these parameters and the pre-defined type definitions. The method includes creating process configuration outputs for the application function, and configuring the one or more IEDs based on the process configuration outputs.

16 Claims, 3 Drawing Sheets

METHOD AND SYSTEM FOR ENGINEERING A SUBSTATION AUTOMATION SYSTEM

RELATED APPLICATION

This application claims priority as a continuation application under 35 U.S.C. §120 to PCT/IB2010/000569, which was filed as an International Application on Mar. 18, 2010 designating the U.S., and which claims priority to Indian Application 1935/CHE/2009 filed in India on Aug. 14, 2009. The entire contents of these applications are hereby incorporated by reference in their entireties.

The invention relates generally to the field of power automation systems and more specifically to a configuration tool for process controllers and for intelligent electronic devices in substation automation systems for process industries and power utilities.

BACKGROUND

Process industries can involve intense energy consumption and include dedicated electrical power generation and distribution systems to meet their energy demands. Examples of process industries include but are not limited to cement, pulp and paper, fertilizer plants, mining and metals, water and waste water treatment plants, refineries and petrochemical plants besides power utilities etc.

These process industries include switchyards to facilitate grid connectivity, power plants to facilitate captive generation and substations for power evacuation and power and distribution to different load centers distributed over various process areas. The substations generally include a plurality of power and distribution transformers, cabling, switching, reactive power and grounding equipment. The electrical equipment in the various process areas includes motors, variable speed drives that in turn drive various process equipment like pumps, compressors etc. These electrical equipment should be protected against power system anomalies like current and voltage surges or power swings, internal faults, process overloads etc. and this can be accomplished by Intelligent Electronic Devices (IEDs) that provide different substation protection, control, monitoring and metering functions. The IEDs are microprocessor-based equipment that are associated with power system equipment, such as circuit breakers, generators, transformers, power lines, power cables, reactors, motors, capacitor banks etc. The IEDs can receive primary power system information like voltage and current from sensors to perform various protection and monitoring functions.

Common types of IEDs include protective relaying devices, load tap changer controllers, circuit breaker controllers, recloser controllers, voltage regulators, feeder managers etc. A single IED can perform several protection, metering, monitoring and control functions concurrently. However, some protection and automation functions need simultaneous participation of multiple IEDs.

The IEC61850 standard from International Electrotechnical Commission (IEC) advocates interoperability amongst Intelligent Electronic Devices (IEDs) from various manufacturers using common engineering models (for example, IEC61850 Common Engineering Model using Logical Nodes), data formats and communication protocol. Recent IEDs are therefore designed to support the IEC61850 standard for substation automation, which provides interoperability and advanced communications capabilities like GOOSE (Generic Object Oriented Substation Event) and MMS (Manufacturing Message System) communication profiles.

A contemporary Substation Automation (SA) system, based on IEC 61850 generally comprises of the following components, Protection and Control (P&C) IEDs, SA Process Controllers IEDs, each of the IEDs with their own Local Human Machine Interfaces (LHMI), Substation Level Human Machine Interface, and Substation (to Control Centre) Gateway.

All the above equipment can involve extensive off line configurations/engineering to be done, before being deployed as a part of a working SA system and to perform their individual functions. For example, the IEDs being closest to the process have data recorded/processed by them passed onto the other categories for various purposes. The SA Process Controller IEDs implement complex automatic substation wide control/power management algorithms for which they need analog and digital data from the P&C IEDs. They also should pass on activation command information (from the algorithms) back to the P&C IEDs. The LHMIs should have configuration data to display information like Single Line Diagrams to perform electrical equipment operation controlled by the IED, settable IED parameters, respective substation bay measurement and status information etc. The Substation Level HMI should also have configuration data to display information like Single Line Diagrams to perform electrical equipment operation controlled all P&C IEDs across the substation, settable parameters for individual IEDs, substation-wide bay measurement and status information etc. The Substation Gateway should have configuration information from the P&C IEDs to be communicated to Remote Control Centres.

Additionally, every IED also should have configured itself for various protection, measurement, monitoring and control functions. This includes at least the following steps that are done manually and/or in a semi automatic manner:

Hardware configuration

Application logic configuration (function blocks and connections between them)

IEC 61850 communication and data configuration

Needed configuration for the LHMI

Mapping and connection of every signal from external IEDs into the application logic Most or all the above sets of steps/purposes are also applicable for SA Process Controller IEDs.

As most of the above steps to perform configuration information for the SA equipment are discrete and complex in nature, a configuration engineer has to spend considerable time and effort to finally deploy or commission the SA equipment and system. Another aspect is that the configuration engineer should be trained in all aspects of the SA engineering to perform the tasks correctly without errors. The high element of manual configuration makes the entire process prone to mistakes and prone to errors, thereby rendering it inefficient and low on productivity.

These multiple manual tasks therefore mean high effort for engineering and configuration of the IEDs/Process Controllers/HMI systems, thereby resulting in higher costs and lower engineering efficiency. Further, any changes in configuration or modification in an application function involves substantial manual activity that implies a substantial amount of time and effort spent.

Hence there is a need to develop a technique that allows efficient and time-saving configuration for the process controller and the IED applications.

BRIEF DESCRIPTION

A method is disclosed for engineering and configuration of one or more Intelligent Electronic Devices (IEDs) and/or process controllers for an application function in a substation automation system, the method comprising: creating pre-defined type definitions for the application function; selecting parameters from a plurality of parameters with respect to the application function; creating a plurality of process configuration outputs for the application function based on the selection of the parameters and the pre-defined type definitions; and configuring the one or more IEDs based on the plurality of process configuration outputs.

A configuration wizard is disclosed for engineering and configuration of one or more IEDs for an application function in a substation automation system, the configuration wizard comprising: an input module configured for receiving a plurality of parameters via a selectable menu for the application function implemented by the IED; and a processing module having a pre-defined type definition for the application function and configured for processing the parameters and for creating a plurality of process configuration outputs for the application function.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
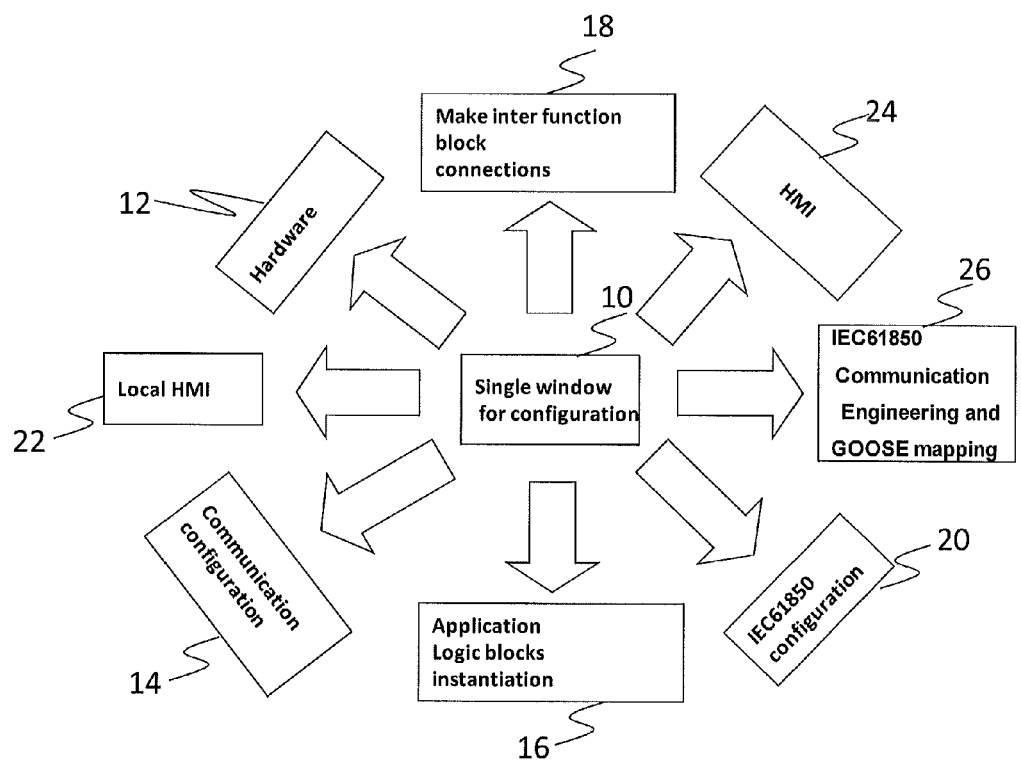
FIG. 1 is a schematic representation of different process configuration outputs that are provided by the exemplary configuration wizard for the configuration of the IED/process controller through the exemplary method.

According to one aspect, a method for engineering and configuration of IEC61850 compliant IED/process controllers for an application function, such as a power management function like load shedding involving multiple IEDs, in a substation automation system is disclosed. The method includes creating pre-defined type definitions for the application function, besides providing keys for building the interconnections for and between the appropriate parameters with respect to the application function that are selected by the user. The appropriate parameters are associated with IEC 61850 Communication, IED or process controller version, network configuration, and order code detection.

As it would be known to one skilled in the art, the IED or process controller version is used to convey the variant of the Power Management function capability or application type that the IED/controller supports, using the engineering tool. Also, the order code detection is used to automatically detect the actual hardware configuration of the IED/controller or also to verify if the application configurations can be taken care by the selected hardware, using the engineering tool. The network configuration aspect of the engineering tool further includes the feature of configuring the elements involved in the load shedding power management function like selection of bus bars, addition or removal of bus bar, selection of power source like a generator or grid connectivity and sheddable load, assignment of power sources and loads to bus bars, association of power sources, loads and network circuit breaker elements to IEDs, addition or removal of power source and sheddable load, and coupler configuration etc.

Using these parameters and the pre-defined type definitions, the method includes automatic creation of multiple process configuration outputs such as automatically creating function blocks, automatically performing connections between them, automatically creating an IEC61850 IED configuration description (ICD) file for the IED/process controller, automatic pre-processing of information, based on IEC61850 GOOSE and MMS, to be sent to and received from the other IEDs based on the application being configured, automatic checking of hardware configuration adequacy, automatic creation of local HMI and Central HMI displays and linking to IEC61850 variables.

According to another aspect, a configuration wizard is used for implementing the above mentioned method. The configuration wizard includes an input module configured for receiving appropriate parameters via a selectable menu for an application function like load shedding to be implemented in the IED/process controller. The configuration wizard further includes a processing module comprising pre-defined type definitions for the application function and configured for processing the appropriate parameters and for creating a plurality of process configuration outputs for that application function. A display module is also provided by the configuration wizard and the display module is configured for displaying the configuration data for the IED/process controller based on the process configuration outputs.

The system and technique described herein can include a single step configuration method for engineering and configuration of an IED/process controller for any application function involving one or many IEDs/process controllers. Some non-limiting examples of application functions for single or multiple IEDs/process controllers include protection, metering, control, monitoring, power management etc.

FIG. 1 is a schematic representation of different process configuration outputs that are provided by the exemplary configuration wizard for the configuration of the IED/process controller through the exemplary method described herein. The different fields that in an exemplary implementation are related to an application function and an IED in accordance to IEC 61850, can be configured through the system and technique described herein are shown in the FIG. 1 and indicated generally by reference numeral 10. The technique includes providing process configuration outputs that include configuration for IED/process controller hardware 12 (hardware as needed for the application function being configured in the IED/controller), IED/process controller communication over IEC 61850 GOOSE and MMS 14, application function blocks instantiation 16 (set of operational parameters pertaining to the function being configured), connections between function blocks 18, IEC61850 configuration (SCL file i.e. Substation Configuration Language file) 20, where the IEC61850 SCL file is configured for the IED/controller along with the IEC61850 data flow (between the concerned IED/controller and other IEC61850 compliant IEDs) configured as perceived for the application function being configured; IEC 61850 configuration 20 includes the appended information from Communication Configuration 14; local HMI display and information configuration 22, HMI display and information configuration 24, and IEC61850 Communication Engineering and mapping GOOSE incoming information (from other IEDs/process controllers) into application logic 26.

The configuration outputs from the configuration wizard pertain to the (output) information that are automatically generated for other aspects of an substation automation system, based on the simple process configuration inputs provided by the user to the configuration wizard and based on the pre-defined type definitions in-built in the configuration wizard. The inputs could be the description of the power system configuration of the plant or substation and the details about the power system equipment in the context of the functionality they are being configured for. These automatically configured outputs (based on the inputs) have been explained hereinabove with respect to FIG. 1.

Figure 2:
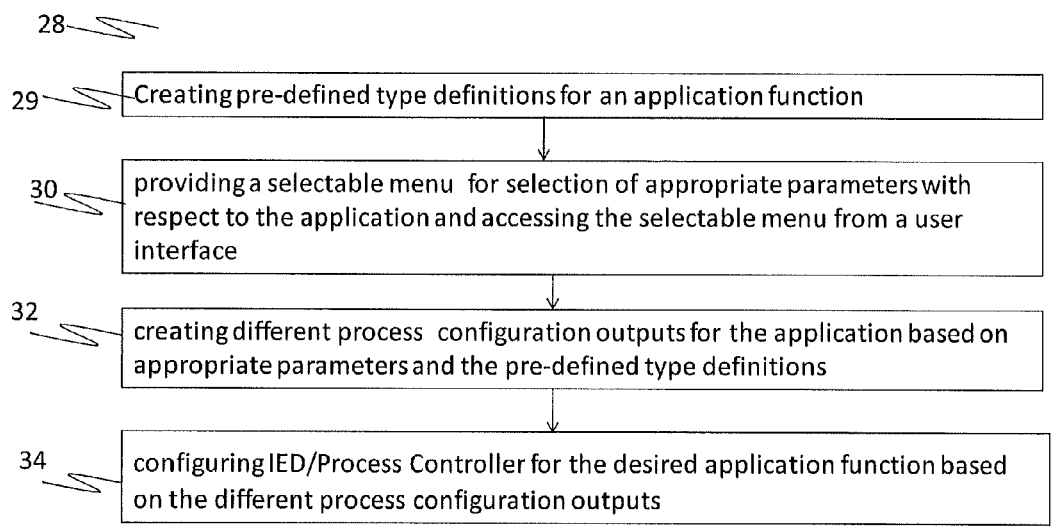
FIG. 2 is flow chart representation of an exemplary flowchart for a method for engineering and configuration of the one or more IEDs for a function in a substation automation system.

FIG. 2 is an exemplary flowchart for a method for engineering and configuration of the IED/process controllers for an application function in a substation automation system that yields the single window integration capability as depicted in FIG. 1. The method described in flowchart 28 in FIG. 2, includes at step 29 creating pre-defined type definitions for an application function implemented through function blocks and appropriate parameters. These pre-defined type definitions allow for the following associations:

IEC61850 communication for the IED/process controller
associating substation equipment like circuit breakers, disconnectors, transformers, bus bars, generators, grid connectivity, load feeders etcetera, with the IED/process controller based on application function
associating the IED/process controller with other IED/process controllers (if any) and HMI depending on the application function
identifying whether other IEDs/process controllers send process information to the IED/process controller being configured, over IEC 61850 GOOSE or through hardwired I/Os.
selection of the hardware components to be used in the IED/process controller The pre-defined type definitions also include definitions for Single Line Diagram (SLD). SLD shows all components (circuit breakers, transformers, capacitors, bus bars, generators and conductors) and is useful to understand the functions of each of the various components as a part of the total system, the SLD is commonly to ascertain the status of the substation or the process at any point in time) for the local and Central HMI systems, that is, the content of the process displays. Alternatively, the SLD definitions can also be included in an IEC61850 configuration file being generated for the IED/process controller from the configuration wizard.

The method also includes performing internal mapping of GOOSE input information, received/to be received from other IEDs/process controllers, to the respective function blocks in the application logic based on the pre-defined type definitions.

The method further includes at step 30, selecting appropriate parameters from multiple parameters that may be provided through a selectable menu for selection of appropriate parameters with respect to the application function. The method also provides for accessing the selectable menu from a user interface. In one example, the user interface is a local HMI associated with a respective one or more IED. In another example, the user interface is a central HMI, common to a plurality of IEDs.

The selectable menu includes different fields in an exemplary implementation. These may be implemented as drop down menus or request windows or any similar graphic to receive the input from the user. The selectable menu allows for the selection of appropriate parameters like but not limited to:

IEC 61850 Communication Protocol,

IED/process controller version for the application function like power management controller for load shedding functionality,
Substation equipment association including bus bars, power sources like generators and grid connectivity and sheddable loads, addition/deletion of sources and sheddable loads, and bus coupler configuration,
Power sources like generator and public utility grid connectivity and sheddable loads,
Substation equipment association with IED and communication association,
Hardware configuration of the one or more IEDs Selectable menu also may provide prompt windows as "next" and "finish" to prompt the user for action.

Once the appropriate parameters have been selected, the method includes processing of these parameters, based on the application function to be configured in the IED/process controller. In one example, for IEC61850 configuration of the IED/process controller (ICD file), the processing step includes deriving:

needed number of Logical Devices (LD) and Logical Nodes (LN) instances
switching and conducting equipment information along with associated LDs and LNs The method also provides for configuration of IEC61850 communication engineering to include the communication of IEC61850 MMS signals between IED/process controller and HMI
to include the communication of IEC61850 GOOSE signals cross flows between IED/process controller being configured and other IEDs/process controllers, based on the application function being configured and IEC61850 configuration done in the other IEDs/process controllers Referring again to FIG. 2, the method at step 32 includes creating different process configuration outputs (as shown in FIG. 1) for the application based on the selection of appropriate parameters and after the processing steps as described herein above using the pre-defined type definitions.

As a result of above, the method at step 34 includes configuring the one or more IEDs for the desired application function based on the different process configuration outputs.

The method also advantageously provides for reconfiguring the one or more IEDs based on one or more new process requisitions. It will be appreciated by one skilled in the art that the one or more new process requisition includes addition or removal of a power system component.

Also, by using a combination of configurable approach based on a superset of functions supported by the IED/process controller or templates based standard solutions (by using the selectable menu and above mentioned steps) approach for engineering for the IED/process controller, their application functions, IEC61850 intrinsic and system specific configuration, local and Central HMI configurations, communication and hardware configurations are configured automatically. Thus, there is virtually no lead time for doing fresh configuration/engineering or introduction of changes. Thus, loading of changes in IED/process controller are minimal and thereby resulting virtually no downtime of the concerned function.

Once completed, the complete configuration can be stored as a template and reused for a different configuration for the same application type, at a later point in time.

The following provides a non-limiting illustrative example for the above method. A user selects number of bus bars and identifies whether the loads or power sources are connected to the bus bar. Based on pre-defined type definitions, and the input from the user, the configuration wizard instantiates, for every bus bar with loads connected to it, one logical device for measurement and another logical node for trip commands in the SCL file. In the logic environment (needs to be defined), the configuration wizard instantiates one measurement and load shedding trip command related function blocks, and inter-function block connection viewable in the logic environment.

The approach and methodology used to enable the quick configuration includes classifying each of the function blocks in the Substation Automation Process Controller IED, in line with their respective roles, for example:

Input interface function blocks: Designated to collect input information for the substation wide control or power management function, from external sources (other Substation Automation Process Controller IEDs and P&C IEDs on IEC 61850 GOOSE or as hardwired signals from field equipment) and pass it on to the Core function blocks Core function blocks: Execute the substation wide control or power management algorithms in one or many function blocks, based on the real time information passed onto them by Input interface function blocks Output interface function blocks: The output or decision information from the Core function blocks needs to be passed onto the other protection and control IEDs or HMI using IEC 61850 or as hardwired signals to the field equipment. These sets of information are logically divided into a series of function blocks.

After classifying the function blocks, each of these function blocks are associated with the IEC 61850 model for the substation wide control or power management application, implemented in the substation Automation Process Controller IED. This is enabled by backend mapping to associate one function block to a single IEC 61850 Logical Node, one function block to multiple IEC 61850 Logical Nodes, and multiple function blocks to a single IEC 61850 Logical Nodes.

Further, each function block's input and output pin information like designation, data type etcetera along with connection rules between these function block pins are described as backend information. The connection rules are then defined for input interface function block and core function blocks, and core function blocks and output interface function blocks Further, each function block is described at the backend, as a type so that many instances of the same type are possible.

It may be noted here, that a limit is set to the number of function blocks that can be instantiated, based on the solution coverage of the IED that could be dependent on the product boundaries, performance limitations etcetera.

Based on the substation wide control or power management application requirements, a pre-determined set of standard input information from external IEDs are also defined in the backend for the following:

Availability of the input signals at their respective output pins of the input interface function blocks Connections between the interface function blocks and the core function blocks IEC 61850 modeling for the external signals from the Protection and Control IEDs Similarly, backend definitions are made for hardware configuration, for example the hardware modules supported by the Substation Automation Process Controller IED are pre-defined in the backend. These definitions are based on the hardware rack, based on hardware inputs to be received from external field equipment, based on hardware outputs to be sent to external field equipment, based on communication capability, based on processor capability, based on power supply requirements.

A limit is also set to the number of hardware modules that can be instantiated, based on the solution coverage of the IED that could be dependent on the product boundaries, performance limitations etcetera.

Similar backend definitions are also made for Single Line Diagram configuration. These definitions are based on the substation wide or power management function requirement, and the Single Line Diagram definitions are made for different objects like generator, transformer, load, bus bar and tie line.

A limit is set here also to the number of objects that can be instantiated, based on the solution coverage of the IED that could be dependent on the product boundaries, performance limitations etcetera.

These definitions at the backend enable the configuration wizard to take selective user inputs and provide the configuration for the IEDs, and/or the process controllers.

Figure 3:
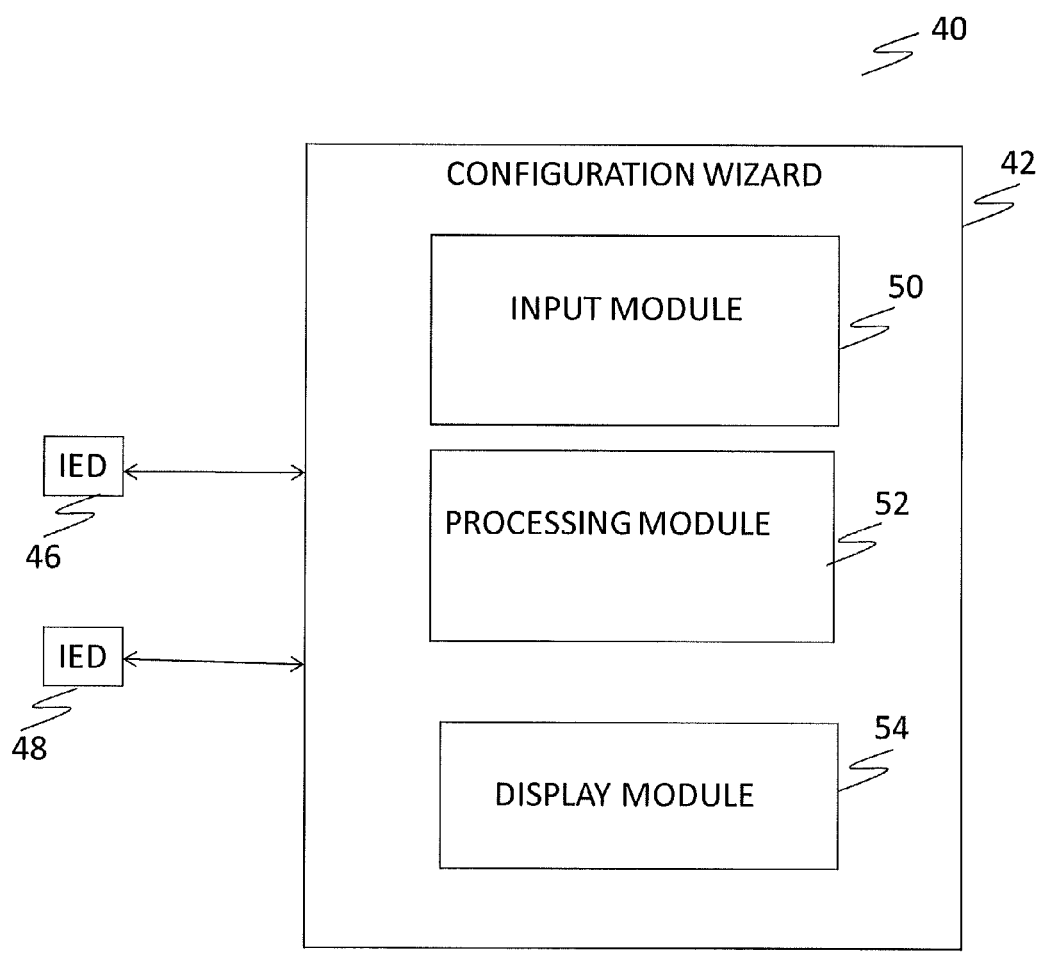
FIG. 3 is a diagrammatic representation a substation automation system that includes a configuration wizard for implementing the method as described in FIG. 2.

The method as described herein above is implemented through an exemplary embodiment as shown in FIG. 3. FIG. 3 is a diagrammatic representation of a substation automation system 40 that includes a configuration wizard 42 for engineering and configuration of the one or more IEDs/process controllers 46, 48. The configuration wizard 42 includes an input module 50 that is configured for receiving appropriate parameters via a selectable menu (user interface) with respect to the application.

The configuration wizard 42 further includes a processing module 52 comprising pre-defined type definitions for an application function. The processing module 52 processed the appropriate parameters using the pre-defined type definitions and creates a plurality of process configuration outputs for the application.

All the process configuration outputs can be viewed in the configuration tool surface. This is generically represented as a generic display module 54.

Once the appropriate parameters have been selected via the selectable menu the configuration wizard undertakes the processing of these parameters for configuration of the one or more IEDs. If there is an error in the selection of parameters or insufficient parameters have been selected then an appropriate message is flashed at the user interface.

It would be appreciated by one skilled in the art that the technique and system described herein advantageously reduces the engineering and configuration time for the process controller and IEDs and thus enhances the levels of efficiency and productivity during installation and commissioning of these devices as a part of the automation system. The technique is also simple and therefore can be used by an engineer with average knowledge/background of the SA system.

While only certain features of the invention have been illustrated and described herein, many modifications and changes will occur to those skilled in the art. It is, therefore, to be understood that the appended claims are intended to cover all such modifications and changes as fall within the true spirit of the invention.

As such, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A method for engineering and configuration of one or more Intelligent Electronic Devices (IEDs) for an application function in a substation automation system, the substation automation system including a processor configured to execute a configuration wizard having an input module and a processing module for engineering and configuration of the substation automation system, the method comprising:

creating pre-defined type definitions in the configuration wizard for the application function in the substation automation system, the pre-defined type definitions include definitions for a human machine interface (HMI) system associated with the one or more IEDs in the substation automation system;

selecting, through the input module, parameters from a plurality of parameters with respect to the application function being configured in the one or more IEDs, the selected parameters including a communication protocol and associated substation equipment;

creating, through the processing module, a plurality of process configuration outputs for configuration of the one or more IEDs and the HMI system for the application function based on the selected parameters and the pre-defined type definitions in the configuration wizard; and configuring the one or more IEDs for the application function and the HMI system associated with the one or more IEDs in the substation automation system based on the plurality of process configuration outputs, wherein configuring the one or more IEDs for the application function and the HMI system associated with the one or more IEDs in the substation automation system are carried out as a single step configuration by the configuration wizard in the substation automation system using the pre-defined type definitions for the application function and the selected parameters from the plurality of parameters with respect to the application function.

2. The method of claim 1, wherein the creating of the pre-defined type definitions comprises:

instantiating one or more logic function blocks for the application function and interconnections between the one or more logic function blocks;

instantiating the plurality of parameters for the application function to be available for selecting; and creating configuration data for display at a user interface associated with the application function for the one or more IEDs and/or process controllers.

3. The method of claim 1, wherein the plurality of parameters further include parameters related to at least one of IEC 61850 Communication, IED/process controller version for the application function, network configuration, and order code detection.

4. The method of claim 3, wherein the network configuration comprises:

a selection of bus bars, addition or removal of a bus bar, selection of power sources and sheddable load, addition or removal of power source and sheddable load, and coupler configuration.

5. The method of claim 1, wherein the plurality of process configuration outputs comprise:

inter function block connections, GOOSE mapping, IEC configuration file for the one or more IEDs, application logic block instantiation, communication configuration, local HMI configuration, central HMI configuration, hardware configuration and combinations thereof.

6. The method of claim 1, wherein the parameters of the associated substation equipment includes data related to at least one of bus bars, power sources, and bus coupler configuration.

7. The method of claim 6, wherein the power sources includes generators, grid connectivity, and loads.

8. The method of claim 1, wherein the parameters of the power sources includes data related to at least one of a generator, grid connectivity, and loads.

9. A configuration wizard in combination with a processing device for engineering and configuration of one or more IEDs for an application function in a substation automation system, the configuration wizard comprising:

an input module in combination with an input interface of the processing device and configured for receiving a plurality of parameters via a selectable menu for the application function being configured in the one or more IEDs, the plurality of parameters including at least one of a communication protocol and associated substation equipment; and a processing module in combination with a processor of the processing device, the processing module having a pre-defined type definition for the application function, the pre-defined type definition including at least one definition for a human machine interface (HMI) system associated with the one or more IEDs, the processing module being configured for processing selected parameters and for creating a plurality of process configuration outputs for the configuration of the one or more IEDs and a Human Machine Interface (HMI) system associated with the one or more IEDs for the application function, wherein the processing module configures the one or more IEDs for the application function and the HMI system via a single step using the pre-defined type definition for the application function and via the selected parameters.

10. The configuration wizard of claim 9, comprising:

a display module configured for displaying configuration data for the one or more IEDs based on the plurality of process configuration outputs.

11. The configuration wizard of claim 9, wherein the display module is configured for displaying the selectable menu for selection of the parameters with respect to the application function.

12. The configuration wizard of claim 10, comprising:

a human machine interface (HMI) for accessing the display module.

13. The configuration wizard of claim 9, wherein the process configuration outputs comprise:

inter function block connections, GOOSE mapping, IEC configuration file for the one or more IEDs, application logic block instantiation, communication configuration, local HMI configuration, central HMI configuration, hardware configuration and combinations thereof.

14. The configuration wizard of claim 9, wherein the parameters of the associated substation equipment includes data related to at least one of bus bars, power sources, and bus coupler configuration.

15. The configuration wizard of claim 14, wherein the power sources includes generators, grid connectivity, and loads.

16. The configuration wizard of claim 9, wherein the parameters of the power sources includes data related to at least one of a generator, grid connectivity, and loads.

* * * * *